(12) United States Patent
Deguchi et al.

(10) Patent No.: US 6,879,101 B2
(45) Date of Patent: Apr. 12, 2005

(54) METAL HALIDE LAMP WITH ELECTRODES HAVING A CURVED SURFACE PART AND AUTOMOTIVE HEADLAMP APPARATUS

(75) Inventors: Makoto Deguchi, Ehime-ken (JP); Hiromichi Kawashima, Ehime-ken (JP); Kozo Uemura, Ehime-ken (JP); Sakae Katayama, Ehime-ken (JP); Yoshiyuki Watanuki, Kanagawa-ken (JP); Hiroyuki Kato, Ehime-ken (JP); Toshihiko Ishigami, Kanagawa-ken (JP); Mikio Matsuda, Tokyo (JP); Toshio Hiruta, Kanagawa-ken (JP)

(73) Assignee: Harison Toshiba Lighting Corp., Imabari (JP)

( * ) Notice: Subject to any disclaimer, the term of this patent is extended or adjusted under 35 U.S.C. 154(b) by 0 days.

(21) Appl. No.: 10/366,375

(22) Filed: Feb. 14, 2003

(65) Prior Publication Data

US 2004/0004438 A1 Jan. 8, 2004

(30) Foreign Application Priority Data

Feb. 15, 2002 (JP) ........................................ 2002-037967

(51) Int. Cl.[7] ................................................. H01K 1/50
(52) U.S. Cl. ........................ 313/569; 313/631; 313/634; 313/637
(58) Field of Search ................................ 313/569, 572, 313/574, 620, 621, 631, 634, 637, 638, 643

(56) References Cited

U.S. PATENT DOCUMENTS 2,459,579 A * 1/1949 Noel .......................... 313/331
2,716,713 A * 8/1955 Noel .......................... 313/576

3,902,090 A * 8/1975 Ekkelboom et al. ........ 313/632

(Continued)

FOREIGN PATENT DOCUMENTS

EP      0 978 864 A2    2/2000
EP      1 032 010 A1    8/2000

(Continued)

OTHER PUBLICATIONS

Mental et al., "Experimental Investigation of Electrodes for High Pressure Discharge Lamps," IEEE (2000), 5:3293–3300.

(Continued)

*Primary Examiner*—Joseph Williams
*Assistant Examiner*—Kevin Quarterman
(74) *Attorney, Agent, or Firm*—Finnegan, Henderson, Farabow, Garrett & Dunner, L.L.P.

(57) ABSTRACT

To provide, in a special situation of a mercury-free lamp in which a luminance flicker tends to occur unlike a mercury-containing lamp, a metal halide lamp having an electrode structure modified so as to suppress the luminous flicker that is suitably used as an automotive headlamp, and an automotive headlamp apparatus incorporating the same. A metal halide lamp includes: a hermetic vessel 1 which is fire resistant and translucent; a pair of electrodes 3, 3 sealed in the hermetic vessel 1 with facing each other at a distant of 5 mm or less, the electrodes each having a shaft part 3a having a diameter of 0.25 mm or more and a tip 3b, which originates an arc, having a curved surface having a radius of one-half or less of the diameter of the shaft part; and a discharge medium essentially containing no mercury, sealed in the hermetic vessel 1, and containing halides of metals including a light-emitting metal in an amount of 0.005 mg/mm$^3$ of an inner volume of the hermetic vessel or more and a xenon gas at 5 atmospheres or higher at a temperature of 25° C., in which the metal halide lamp is turned on with a lamp power of 60 W or lower in a stable state.

16 Claims, 7 Drawing Sheets

U.S. PATENT DOCUMENTS

| | | | |
|---|---|---|---|
| 4,968,916 A | * 11/1990 | Davenport et al. | 313/571 |
| 5,083,059 A | 1/1992 | Graham et al. | 313/631 |
| 5,117,154 A | * 5/1992 | Thomas et al. | 313/634 |
| 5,627,430 A | * 5/1997 | Kira et al. | 313/570 |
| 5,789,850 A | * 8/1998 | Iwafuji et al. | 313/318.08 |
| 6,495,962 B2 | * 12/2002 | Uemura et al. | 315/77 |

FOREIGN PATENT DOCUMENTS

| | | |
|---|---|---|
| EP | 0 978 864 A3 | 11/2001 |
| EP | 1 172 840 A2 | 1/2002 |
| FR | 1.476.198 | 2/1967 |
| JP | 2001-102001 | 4/2001 |

OTHER PUBLICATIONS

John M Davenport et al., "Xenon–Metal Halide Lamp For Automobile Having Improved Electrode Structure", Patent Abstracts of Japan of JP 03–163744, Jul. 15, 1991.

R. Botticher et al., "Numerical Modelling of arc Attachment To Cathodes of High–Intensity Discharge Lamps", J. Phys, D: Appl. Phys. vol. 33, pp. 367–374.

* cited by examiner

METAL HALIDE LAMP WITH ELECTRODES HAVING A CURVED SURFACE PART AND AUTOMOTIVE HEADLAMP APPARATUS

BACKGROUND OF THE INVENTION

1. Field of the Invention

The present invention relates to a metal halide lamp and an automotive headlamp apparatus incorporating the same.

2. Description of the Related Art

The present inventors have developed a metal halide lamp suitable for an automotive headlamp that substantially contains no mercury (conveniently referred to as a mercury-free lamp, hereinafter). The metal halide lamp has electrodes each having a shaft part 0.3 mm or more in diameter and a planar tip, the distance between the electrodes being 5 mm or less. And, the metal halide lamp has, sealed in a hermetic vessel as a discharge medium, halides of metals including a light-emitting metal in an amount of 0.005 mg/mm$^3$ of the inner volume of a hermetic vessel or more and a xenon gas at 5 atmospheres or more at 25° C. The above-described halides additionally include a halide of a metal that has a high vapor pressure and emits no or a relatively little visible light, the halide being intended to provide a lamp voltage in place of a mercury vapor. The mercury-free lamp is turned on with a lamp power of 60 W or lower.

For example, in Japanese Patent Laid-Open No. 5-57696, there is described an electrode of a high intensity discharge lamp, such as a metal halide lamp, whose tip is thicker than the shaft part thereof and is spherical in shape (Related Art 1).

Furthermore, in J. Phys. D: Appl. Phys. 33 (2000) 367–374. Printed in the UK, there is described a cathode of a high intensity discharge lamp whose tip has a curved surface having a radius of one-half of a diameter of the shaft part of the cathode (Related Art 2).

In contrast to the metal halide lamp having mercury sealed therein (conveniently referred to as a mercury-containing lamp, hereinafter), since the mercury-free lamp described above has no mercury sealed therein, it cannot provide a thick arc, which would be provided in the presence of a mercury vapor. This means that the resulting arc is relatively narrow, and thus, unstable, so that a luminance flicker tends to occur.

A halide vapor intrinsically serves to make discharge narrow and unstable. Furthermore, in the mercury-free lamp, a halide of a metal having a high vapor pressure may be sealed to provide a lamp voltage and/or correct a chromaticity. Therefore, the mercury-free lamp has a halide vapor pressure several orders of magnitude higher than that of the mercury-containing lamp. The higher vapor pressure of the halide of the metal results in a narrower, and therefore, more unstable arc, so that a luminance flicker tends to more readily occur.

In addition, in the mercury-containing lamp, $HgI_2$ is produced from mercury, and therefore, a free halogen is unlikely to occur. To the contrary, in the mercury-free lamp, since no $HgI_2$ is produced, a free halogen is easy to occur. Since the free halogen highly adsorbs electrons, the resulting arc is narrow, and thus, a luminance flicker tends to occur.

As for the conventional electrode configuration of the metal halide lamp, according to the Prior Art 1, the electrode has a tip which has a curved surface and is wider than the diameter of the shaft part thereof. In addition, the lamp according to the Prior Art 1 is a mercury-containing lamp and is not intended to reduce the luminance flicker. According to the description of the Prior Art 1, the above-described electrode configuration is intended to be adapted for various current values in various operation phases of the high-pressure xenon/metal halide lamp.

The electrode configuration according to the Prior Art 2 is the same as that according to the invention described later. However, in the Prior Art 2, a temperature distribution of the electrode is only calculated, and no mention is made of the relationship between the configuration and the luminance flicker and the mercury-free lamp.

SUMMARY OF THE INVENTION

An object of the invention is to provide, in a special situation of a mercury-free lamp in which a luminance flicker tends to occur unlike a mercury-containing lamp, a metal halide lamp having an electrode structure modified so as to suppress the luminance flicker that is suitably used as an automotive headlamp, and an automotive headlamp apparatus incorporating the same.

A metal halide lamp described in claim 1 of the invention comprises: a hermetic vessel which is fire resistant and translucent; a pair of electrodes sealed in the hermetic vessel with facing each other at a distant of 5 mm or less, the electrodes each having a shaft part having a diameter of 0.3 mm or more and a tip, which originates an arc, having a curved surface having a radius of one-half or less of the diameter of the shaft part; and a discharge medium substantially containing no mercury, sealed in the hermetic vessel, and containing halides of metals including a light-emitting metal in an amount of 0.005 mg/mm$^3$ of an inner volume of the hermetic vessel or more and a xenon gas at 5 atmospheres or higher at a temperature of 25° C., wherein, in a stable state, the metal halide lamp is turned on with a lamp power of 60 W or lower.

Terms used in the following description of the present invention have definitions and technical meanings as follows unless otherwise specified.

[Hermetic Vessel]

The hermetic vessel is fire resistant and translucent. The words "fire resistance" mean that the hermetic vessel can adequately withstand a normal operating temperature of the discharge lamp. Therefore, the hermetic vessel may be made of any material as far as it has a fire resistance and can allow the visible light in a desired wavelength range produced by the discharge to be emitted to the outside. For example, the hermetic vessel may be made of a ceramic, such as quartz glass, translucent alumina and YAG, or a single crystal thereof. As required, the inner surface of the hermetic vessel may be coated with a transparent film having a halogen resistance or halide resistance, or may be modified.

The hermetic vessel has a discharge space formed therein. In the case of a small metal halide lamp, such as a metal halide lamp for an automotive headlamp, the discharge space preferably has an inner volume of 0.01 cc or less and has a shape of an elongated cylinder with an inner diameter of 1.5 to 3.5 mm and a longitudinal length of 5 to 9 mm. When the lamp is turned on in a horizontal position, the arc tends to be bent upwardly and gets closer to the upper inner surface of the hermetic vessel. Thus, the temperature of the hermetic vessel increases faster in the upper portion thereof.

Furthermore, a part of the hermetic vessel which surrounds the discharge space can have a relatively high thickness. That is, a part of the hermetic vessel around the middle of the distance between the electrodes can be thicker than the end parts thereof. This enhances heat transfer of the hermetic vessel, whereby the temperature of the discharge medium adhered to the inner surface of the lower part and side part of the discharge space of the hermetic vessel increases faster. Thus, a rapid rising of the luminous flux is attained.

Furthermore, in order for electrodes described later to be sealed in the hermetic vessel, a pair of rod-shaped sealing parts may be provided integrally with the hermetic vessel at both the longitudinal ends of the discharge space formed in the hermetic vessel. The electrodes are each connected to an externally introduced line via a sealed metal foil by, preferably, a decompression sealing method, whereby the electrodes can be supplied with power.

[A Pair of Electrodes]

The pair of electrodes is sealed in the hermetic vessel with the electrodes facing each other at a distance of 5 mm or less in general. In the case of a small metal halide lamp, such as a metal halide lamp for an automotive headlamp, the distance is preferably 3.5 to 5 mm, and more preferably 4.2 mm±0.6 mm. Each of the electrodes has a rod-shaped shaft part having a diameter substantially uniform in the longitudinal direction. The diameter of the shaft part is equal to or more than 0.25 mm, and preferably falls within a range from 0.25 to 0.4 mm. In the case of a small metal halide lamp, such as a metal halide lamp for an automotive headlamp, the diameter preferably falls within a range from 0.3 to 0.4 mm, more preferably within a range from 0.35 to 0.4 mm. The electrode is not widened from the shaft part thereof to the tip thereof, and a part thereof located near the tip, which originates an arc, has a curved surface. The diameter of the shaft part must be equal to or more than 0.25 mm in order to withstand a high lamp current that flows therethrough when the lamp voltage is low immediately after turn-on of the lamp.

The curved surface of the part of the electrode located near the tip, which originates an arc is spherical, and the radius thereof is generally one-half or less of, preferably 0.2 to 0.5 times the diameter of the shaft part. Here, the words "part of the electrode which originates an arc" located near the tip mean a part of the electrode which is located at the tip of the electrode and originates an arc and parts peripheral thereto. It does not necessarily refer to whole of the geometrical configuration of the tip of the electrode. That is, it is essential only that the part of the electrode which is located at the tip of the electrode and originates an arc has a curved surface having a radius of one-half or less of the diameter of the shaft part of the electrode. Here, the curvature of the curved surface is to be represented by a mean value of curvatures of the part which originates an arc and parts peripheral thereto. Preferably, however, the curved surface of the tip of the electrode which originates an arc has a radius of 40% or more of one-half of, that is, 0.2 to 0.5 times the diameter of the shaft part.

The curved surface of the part of the electrode which originates an arc may be one similar to spherical surface, as well as the spherical surface. The curved surface of the part of the electrode which originates an arc may be directly connected to the rod-shaped part of the shaft part, or a conical intermediate part may be interposed between the curved surface of the tip which originates an arc and the rod-shaped part of the shaft part. The conical intermediate part may be linearly tapered or convexly tapered with a radius different from that of the curved surface of the tip. Furthermore, if the tip of the electrode has a substantially planar surface, the part which originates an arc is provided by the shoulder surrounding the planar surface. In such a case, the electrode may be formed with the shoulder having a curved surface having a radius of one-half or less of the diameter of the shaft part of the electrode.

The length of the electrode protruding into the hermetic vessel, as well as the diameter of the shaft, affects the temperature of the electrode. This can be the same as in common small metal halide lamps of this type. Thus, for example, it can be set to about 1.4±0.1 mm. Furthermore, the pair of electrodes may be adapted for an alternating current or direct current. If the lamp is operated by an alternating current, the electrodes of the pair have the same structure. If the lamp is operated by a direct current, in general, the temperature of the anode increases rapidly. Thus, the anode is allowed to have a shaft diameter larger than that of the cathode and thus a heat radiating area larger than that of the cathode, and can be ready for a frequent on/off operation.

The electrodes may be made of tungsten, doped tungsten, rhenium, a rhenium/tungsten alloy or the like. Furthermore, according to an arrangement for sealing the electrodes in the hermetic vessel, the electrodes may be supported by the base end parts thereof being embedded in the pair of sealing parts of the hermetic vessel. Here, the base end of the electrode is connected, by welding or the like, to the sealed metal foil made of molybdenum or the like that is hermetically embedded in the sealing part.

[Discharge Medium]

The discharge medium contains halides of metals including a light-emitting metal in an amount of 0.005 mg/mm$^3$ of the inner volume of the hermetic vessel or more and a xenon gas at 5 atmospheres or more at 25° C. The discharge medium substantially contains no mercury. The words "halides of metals including a light-emitting metal" mean that the halides include at least a halide of a light-emitting metal, and as required, the halides may include a halide of a metal other than light emitting metals that has a high vapor pressure and emits no or a relatively little visible light.

The halide of a light-emitting metal is not limited to a particular substance according to the invention. However, for use in the automotive headlamp, it is preferred that the halide of a light-emitting metal comprises at least one or two of iodides of sodium Na, scandium Sc and rare earth metals. Sodium Na, scandium Sc and rare earth metals described above are highly efficient light-emitting substances and suitably used as a primary light-emitting metal. These metals are preferably sealed in the form of iodide. However, substantially, a halide of another light-emitting metal, indium In, for example, may be additionally sealed in the hermetic vessel. In such a case, indium is suitably sealed in the hermetic vessel in a relatively small amount in the form of iodide or bromide. This facilitates a chromaticity of light emitted by the metal halide lamp meeting the value specified for the automotive headlamp.

On the other hand, as a halide of a metal which has a high vapor pressure and emits no or a relatively little visible light, that is, a halide of a metal which is not a promising light-emitting metal but is suitable for providing a lamp voltage, the halide(s) of one or more metals selected among from the group of Mg, Co, Cr, Zn, Mn, Sb, Re, Ga, Sn, Fe, Al, Ti, Zr and Hf may be added to the discharge medium. These lamp-voltage-providing media contribute to provide a lamp voltage in place of mercury and can provide a lamp voltage on the order of 25 to 70 V. These lamp-voltage-providing media are commonly characterized in that they have a relatively high vapor pressure and emit a relatively little visible light, and these media can be selectively sealed in the hermetic vessel in an adequate amount to increase the lamp voltage so as to fall within a desired range. Thus, a desired lamp power can be supplied to the metal halide lamp by a relatively low lamp current.

Since the halide is sealed in an amount of 0.005 mg/mm$^3$ of the inner volume of the hermetic vessel or more, the total amount of the halide sealed in the hermetic vessel can be determined by multiplying the value by the inner volume of the hermetic vessel in a unit of mm$^3$. According to the invention, the halide is sealed in the hermetic vessel in an amount significantly larger than that of the mercury-containing lamp. The halide is sealed in the hermetic vessel in an excessive amount, and an excess of the halide, which has not been evaporated, is in the liquid phase and adhered to the inner wall of the hermetic vessel when the lamp is on.

A halogen which forms such a halide will be described now. In terms of reactivity, iodine is most suitable. At least the primary light-emitting metal described above is sealed in the hermetic vessel in the form of an iodide. However, substantially, different compounds of halogen, for example iodide and bromide, may be used together.

The xenon gas serves as a starting gas and a buffer gas and serves also to dominantly emit light immediately after the starting. The pressure of the sealed xenon gas is 5 atmospheres or more at 25° C., and preferably falls within a range from 5 to 20 atmospheres. In the case of a metal halide lamp for an automotive headlamp, the pressure preferably falls within a range from 8 to 16 atmospheres. Since the pressure of the sealed xenon gas is high, the lamp voltage of the metal halide lamp is also high. Thus, a higher lamp power can be provided with respect to a same lamp current, and an improved rising characteristics of the luminous flux can be provided. The good rising characteristics of the luminous flux, which are advantageous for any use of the lamp, are essential particularly in applications of automotive headlamp, liquid-crystal projector and the like.

Now, mercury will be described. The words "substantially contain no mercury" in the invention mean that mercury is not sealed at all or that mercury may exist in an amount of less than 2 mg/cc of the inner volume of the hermetic vessel, preferably 1 mg/cc of the inner volume the hermetic vessel or less. However, it is desirable that no mercury is sealed from an environmental point of view. If the lamp voltage of the discharge lamp is to be increased to a desired level by the action of a mercury vapor as in the prior art, the mercury is sealed in the hermetic vessel in an amount of 20 to 40 mg/cc, possibly 50 mg/cc, of the inner volume of the hermetic vessel in the case of a short arc type metal halide lamp. Compared with this, the amount of mercury is significantly reduced.

[Lamp Power]

The lamp power is a power supplied to the metal halide lamp. According to the invention, it is 60 W or less during a stable lighting-on time of the lamp. This means that the lamp is a small metal halide lamp. In the case of a metal halide lamp for an automotive headlamp, the lamp power is preferably 35 W±3 W.

[Other Components of the Invention]

The following components are not essential in the invention. However, selectively adding any of these components to the metal halide lamp can enhance the performance and function thereof.

1. Outer Jacket

The outer jacket houses a discharge vessel therein. The outer jacket can block ultraviolet rays from being emitted from the discharge vessel to the outside, maintain the temperature of the discharge vessel or mechanically protect the discharge vessel. As required, the outer jacket may be hermetically sealed from the outside air or may have air or an inert gas at an atmospheric or reduced pressure sealed therein. Furthermore, substantially, it maybe communicated with the outside air.

2. Cap

The cap serves to connect the metal halide lamp to a lighting circuit or mechanically support the metal halide lamp.

3. Igniter

The igniter is to produce a high pulsed voltage and apply the voltage to the metal halide lamp to promote starting of the metal halide lamp. It can be integrated with the metal halide lamp when it is contained inside the cap.

4. Start Assistant Conductor

The start assistant conductor is to increase an electric field strength in the vicinity of the electrodes, thereby facilitating starting of the metal halide lamp. One end of the start assistant conductor is connected to a part at the same potential as one electrode, and the other end thereof is disposed on a region of the outer surface of the discharge vessel in the vicinity of the other electrode.

[Operation of the Invention]

Since the conventional mercury-free lamp has a large amount of halides of metals sealed therein as described above, a luminance flicker tends to occur. However, according to the invention, since the tip of the electrode which originates an arc has a curved surface having a radius of one-half of the diameter of the shaft part, the luminance flicker is reduced significantly. If the radius of the curved surface of the tip of the electrode which originates an arc is larger than one-half of the diameter of the shaft part, the temperature of the electrode is excessively reduced. Thus, the electron emittance thereof is reduced, and the luminance flicker is likely to occur. On the other hand, if the radius of the curved surface of the tip of the electrode which originates an arc is less than 40% of the diameter of the shaft part, the luminance flicker is likely to occur. In this case, in addition, the temperature of the electrode is excessively increased, and the electrode is likely to be damaged, that is, evaporated.

The metal halide lamp described in claim 2 is the metal halide lamp described in claim 1, in which the diameter of the shaft part of each of the pair of electrodes is 0.25 to 0.4 mm.

According to the invention, a preferred range of the diameter of the shaft part of each of the pair of electrodes is prescribed. If the diameter of the shaft part of the electrode is less than 0.25 mm, the temperature of the electrode is excessively increased, leading to a reduced life time thereof. If the diameter is more than 0.4 mm, the efficiency of light emission is disadvantageously excessively lowered.

The metal halide lamp described in claim 3 is the metal halide lamp described in claim 1 or 2, in which the part of each of the pair of electrodes, which originates an arc, has a curved surface having a radius which is 0.2 to 0.5 times the diameter of the shaft part.

According to the invention, a preferred range of the curvature of the curved surface of the part which originates an arc located near the tip of each of the pair of electrodes is prescribed. That is, if the radius of the part is 0.2 times the diameter of the shaft part or less, the electrode is disadvantageously remarkably exhausted.

The metal halide lamp described in claim 4 is the metal halide lamp described in any one of claims 1 to 3, in which the xenon gas in the discharge medium is at a pressure of 5 to 20 atmospheres.

According to the invention, a preferred range of the pressure of the sealed xenon gas is prescribed. That is, if the pressure of the sealed xenon gas is higher than 20 atmospheres, the metal halide lamp is difficult to manufacture, and the inner pressure of the metal halide lamp during the lighting-on time thereof is excessively increased.

The metal halide lamp described in claim 5 comprises: a hermetic vessel which is fire resistant and translucent; a pair of electrodes sealed in the hermetic vessel with facing each other at a distant of 5 mm or less, the electrodes each having a shaft part having a diameter of 0.25 to 0.4 mm and a part which originates an arc having a curved surface having a radius which is 0.2 to 0.5 times the diameter of the shaft part; and a discharge medium substantially containing no mercury, sealed in the hermetic vessel, and containing halides of metals including a light-emitting metal in an amount of 0.005 mg/mm$^3$ of an inner volume of the hermetic vessel or more and a xenon gas at 5 to 20 atmospheres at a temperature of 25° C., in which, in a stable state, the metal halide lamp is turned on with a lamp power of 60 W or lower.

According to the invention, a metal halide lamp is defined which meets the conditions of the preferred numerical ranges prescribed for the metal halide lamp described in claim 1.

The metal halide lamp described in claim 6 is the metal halide lamp described in claim 5, in which the inner volume of the hermetic vessel is 0.01 cc or less.

According to the invention, an inner volume of the hermetic vessel suitable for a small metal halide lamp, such as a metal halide lamp for an automotive headlamp, is prescribed.

The metal halide lamp described in claim 7 is the metal halide lamp described in claim 5 or 6, in which the paired electrodes are at a distance of 3.5 to 5 mm from each other.

According to the invention, a range of the distance between the electrodes suitable for a small metal halide lamp, such as a metal halide lamp for an automotive headlamp, is prescribed.

The metal halide lamp described in claim 8 is the metal halide lamp described in any of claims 5 to 7, in which the diameter of the shaft part of each of the pair of electrodes is 0.3 to 0.4 mm.

According to the invention, a range of the diameter of the shaft part of the electrode suitable for a small metal halide lamp, such as a metal halide lamp for an automotive headlamp, is prescribed. That is, if the diameter of the shaft part of the electrode is equal to or more than 0.3 mm, the metal halide lamp can have an adequate life time. However, if the diameter is more than 0.4 mm, the efficiency of light emission is disadvantageously excessively lowered.

The metal halide lamp described in claim 9 is the metal halide lamp described in any of claims 5 to 8, in which the halides of metals include at least one of halides of Sc, Na and rare earth metals.

According to the invention, principal metal halides suitable for a metal halide lamp for an automotive headlamp are prescribed. These halides effectively provide white light emission, which is specified for the metal halide lamp for an automotive headlamp, with high efficiency.

The metal halide lamp described in claim 10 is the metal halide lamp described in any of claims 5 to 9, in which the xenon gas is at a pressure of 8 to 16 atmospheres.

According to the invention, a range of the pressure of the sealed xenon gas suitable for a metal halide lamp for an automotive headlamp is prescribed. That is, since the pressure of the sealed xenon gas is 8 atmospheres or higher, the lamp voltage is increased to a preferred value, and good rising characteristics of the luminous flux are provided. In addition, since the pressure of the sealed xenon gas is 16 atmospheres or lower, the metal halide lamp is easy to manufacture, and the inner pressure of the metal halide lamp during the lighting-on time thereof is not excessively increased.

The metal halide lamp described in claim 11 is the metal halide lamp described in any of claims 1 to 10, in which the lamp power is 35 W±3 W.

According to the invention, a range of the lamp power suitable for a metal halide lamp for an automotive headlamp is prescribed.

The metal halide lamp described in claim 12 is the metal halide lamp described in any of claims 1 to 11, comprising: a hermetic vessel which is fire resistant and translucent and has an inner volume of 0.01 cc or less; a pair of electrodes sealed in the hermetic vessel with facing each other at a distant of 3.5 to 5 mm, the electrodes each having a shaft part having a diameter of 0.3 to 0.4 mm and a part which originates an arc having a curved surface having a radius which is 0.2 to 0.5 times the diameter of the shaft part; and a discharge medium substantially containing no mercury, sealed in the hermetic vessel, and containing halides of metals including a light-emitting metal, which is at least one of Sc, Na and rare earth metals, in an amount of 0.005 mg/mm$^3$ of an inner volume of the hermetic vessel or more and a xenon gas at 8 to 16 atmospheres at a temperature of 25° C., in which, in a stable state, the metal halide lamp is turned on with a lamp power of 60 W or lower.

According to the invention, an essential configuration of the lamp that suitably serves as a metal halide lamp for an automotive headlamp is prescribed.

The metal halide lamp described in claim 13 is the metal halide lamp described in claim 12, in which the paired electrodes are at a distance of 4.2±0.6 mm from each other.

According to the invention, a distance between the electrodes suitable for a metal halide lamp for an automotive headlamp is prescribed.

The metal halide lamp described in claim 14 is the metal halide lamp described in claim 12 or 13, in which the halides of metals in the discharge medium include at least ScI$_3$ and NaI.

According to the invention, constituent metal halides more suitable for a metal halide lamp for an automotive headlamp is prescribed. That is, sealing the halides of scandium Sc and sodium Na, which are primary light-emitting metals, in the hermetic vessel can provide white light emission with high efficiency and facilitate the chromaticity of the emitted light falling within a range of a specified value.

The metal halide lamp described in claim 15 is the metal halide lamp described in any of claims 12 to 14, in which the halides of metals in the discharge medium include at least ScI$_3$, NaI, and InBr and/or InI.

According to the invention, constituent metal halides more suitable for a metal halide lamp for an automotive headlamp is prescribed. That is, sealing the halide of indium In, in addition to the halides of scandium Sc and sodium Na, which are primary light-emitting metals, in the hermetic vessel can further facilitate the chromaticity of the emitted light falling within the range of the specified value.

An automotive headlamp apparatus of the invention described in claim 16 comprises: an automotive headlamp apparatus main unit; a metal halide lamp described in any one of claims 1 to 16 installed in the automotive headlamp apparatus main unit; and a lighting device for turning on the metal halide lamp.

Since the automotive headlamp apparatus according to the invention has the metal halide lamp described in any one of claims 1 to 16 as a light source, it produces less luminance flicker. In addition, since mercury, which places a significant load on the environment, is not sealed in the metal halide lamp, the automotive headlamp apparatus of the invention is extremely preferable from an environmental point of view. Here, the "automotive headlamp apparatus main unit" refers to the whole of the automotive headlamp apparatus except the metal halide lamp and the lighting device.

The lighting device turns on the metal halide lamp as desired. Preferably, it turns on the metal halide lamp in such a manner that a maximum power input within 4 seconds after the metal halide lamp is turned on is 2.5 to 4 times higher than the lamp power in a stable state. This can provide a rapid rising of the luminous flux within 4 seconds after the lamp is turned on and a luminous intensity of 8000 cd at a representative point of the front surface of the headlamp, which is required for the automotive headlamp.

Furthermore, the metal halide lamp used in the invention is generally has a lamp voltage lower than that of the mercury-containing lamp. Thus, substantially, the lighting device can be designed to have a no-load output voltage of 200 V or less. Accordingly, the lighting device can be downsized. Here, the mercury-containing lamp requires a no-load output voltage on the order of 400 V.

DETAILED DESCRIPTION OF THE PREFERRED EMBODIMENTS

Embodiments of the invention will be described below with reference to the drawings.

Figure 1:
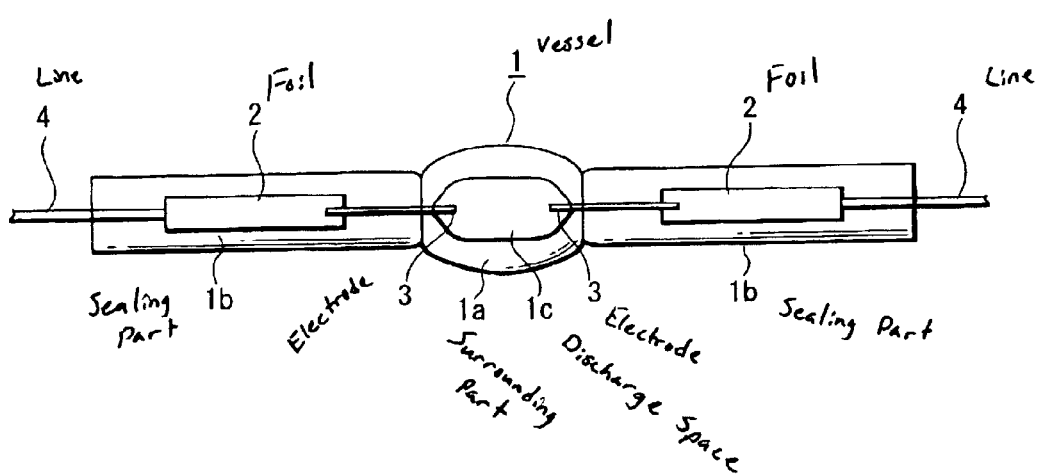
FIG. 1 is a front view of a metal halide lamp according to a first embodiment of the invention.
Figure 2:
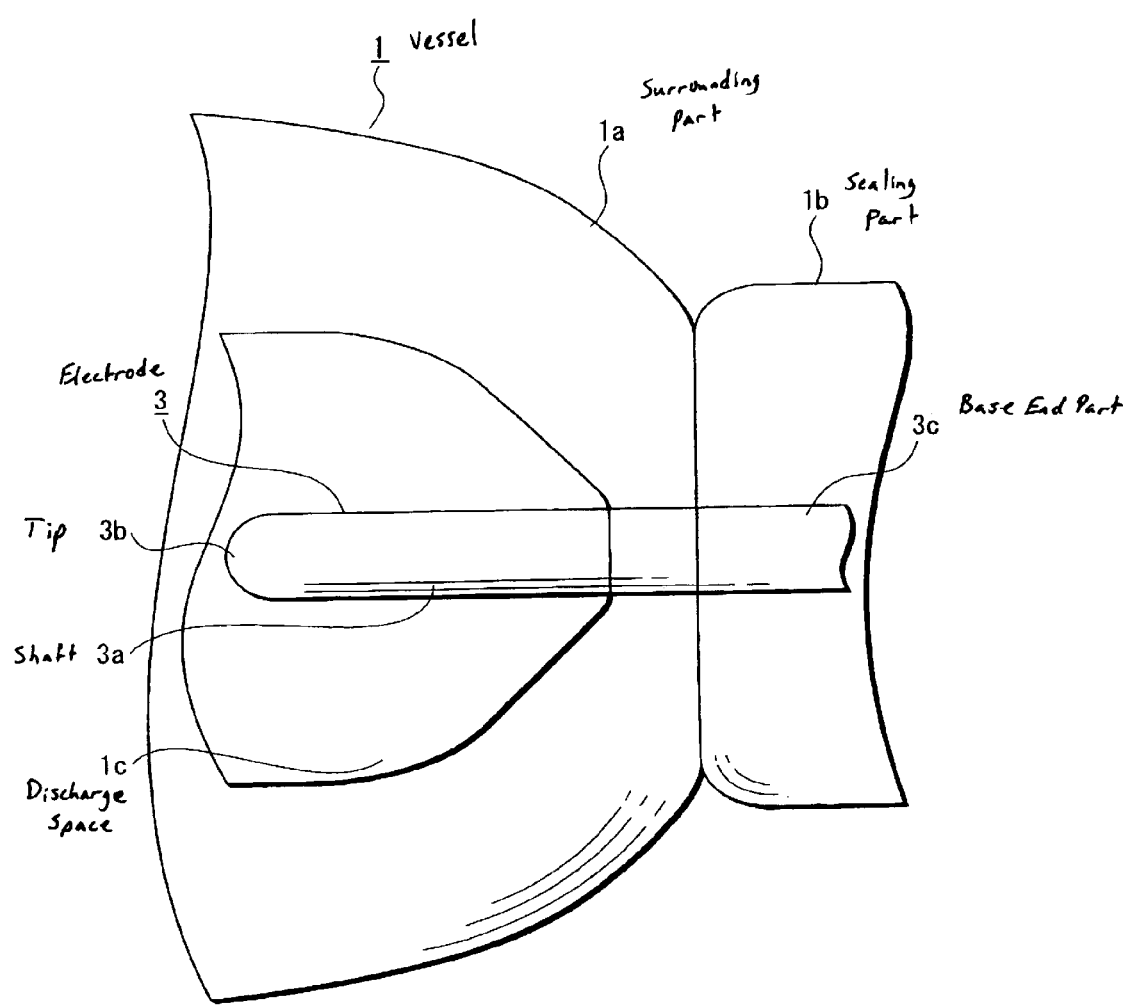
FIG. 2 is an enlarged front view of essential parts of the metal halide lamp.

FIGS. 1 and 2 shows a metal halide lamp according to a first embodiment of the invention. FIG. 1 is a front view thereof, and FIG. 2 is an enlarged front view of essential parts thereof. In the drawings, reference numeral 1 denotes a hermetic vessel, reference numeral 2 denotes a sealed metal foil, reference numerals 3, 3 denote a pair of electrodes, and reference numeral 4 denotes an externally introduced line.

The hermetic vessel 1 comprises a surrounding part 1a, and a pair of sealing parts 1b, 1b. The surrounding part 1a is shaped into a hollow spindle and the inside thereof constitutes a longitudinally elongated cylindrical discharge space 1c. The pair of sealing parts 1b, 1b are formed at both ends of the surrounding part 1a integrally therewith.

The sealed metal foil 2 is a ribbon-shaped molybdenum foil. It is hermetically embedded in each of the sealing part 1b, 1b of the hermetic vessel 1 by a decompression sealing method.

Each of the paired electrodes 3, 3 has a rod-shaped shaft part 3a, and a tip 3b of the shaft part 3a of the electrode, which originates an arc, has a hemispherical curved surface having a radius of one-half or less of a diameter of the shaft part 3a. The electrodes are supported by respective base end parts 3c being embedded in the paired sealing parts 1b, 1b of the hermetic vessel 1 and protrude into the discharge space 1c from the both ends of the surrounding part 1a of the hermetic vessel 1 to face each other at a distant of 5 mm or less. A base end of each of the paired electrodes 3, 3 is connected to one end of the sealed metal foil 2.

The externally introduced line 4 has a tip welded to the other end of the sealed metal foil 2 and is led to the outside from the sealing part 1b of the hermetic vessel 1.

In the hermetic vessel 1, halides of a light-emitting metal and a metal for providing a lamp voltage and a xenon gas are sealed as a discharge medium.

EXAMPLE

The hermetic vessel 1 was made of quartz glass and had an outer diameter of 6 mm and an inner diameter of 2.7 mm, and the surrounding part thereof was 7.0 mm long.

The electrode 3 was made of tungsten, the shaft part thereof had a diameter of 0.35 mm, the radius of the curved surface of the part thereof which originates an arc was 0.175 mm, the distance between the electrodes was 4.2 mm, and the length of protrusion of the electrode protruding into the discharge space was 1.4 mm.

The discharge medium contained metal halides in a relationship of $ScI_3$—$NaI$—$ZnI_2$=0.8 mg and a xenon gas at 10 atmospheres at a temperature of 25° C.

The electrical characteristics were as follows: the lamp power was 35 W and the lamp voltage was 42 V (both in a stable state).

Now, other embodiments of the metal halide lamp of the invention will be described with reference to FIGS. 3 to 6. In these drawings, the same parts as in FIGS. 1 and 2 are the same reference numerals, and any overlap of description thereof will be avoided.

Figure 3:
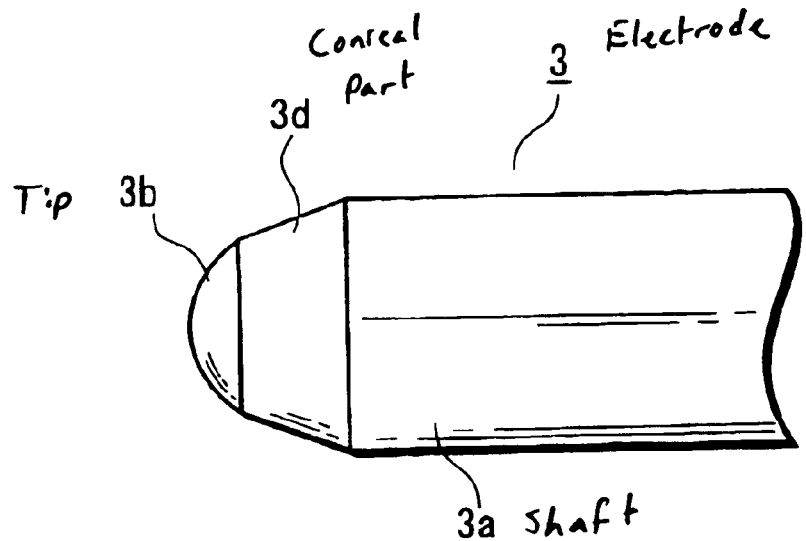
FIG. 3 is an enlarged front view of an electrode of a metal halide lamp according to a second embodiment of the invention.

FIG. 3 is an enlarged front view of an electrode of a metal halide lamp according to a second embodiment of the invention. According to this embodiment, the radius of the curved surface of the region 3b of the electrode 3, having the part formed therein which originates an arc is one-half of the diameter of the shaft part 3a. However, unlike the first embodiment, a truncated conical part 3d is interposed between the curved surface and the rod-shaped shaft part 3a.

Figure 4:
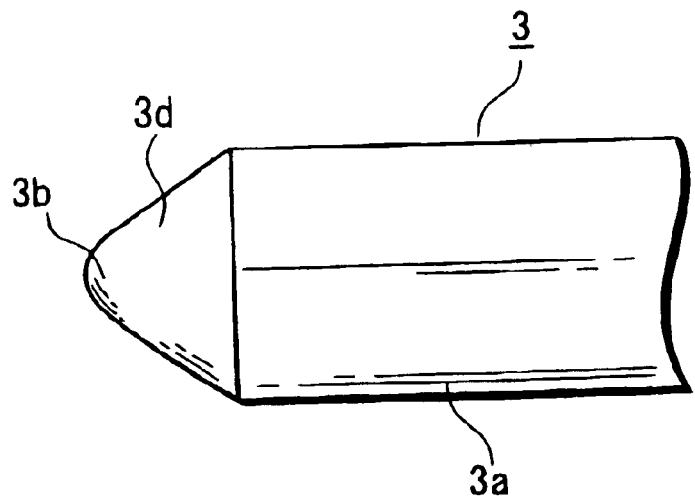
FIG. 4 is an enlarged front view of an electrode of a metal halide lamp according to a third embodiment of the invention.

FIG. 4 is an enlarged front view of an electrode of a metal halide lamp according to a third embodiment of the invention. According to this embodiment, unlike the first embodiment, the radius of the curved surface of the region 3b of the electrode 3, having the part formed therein which originates an arc is 40% of the diameter of the shaft part 3a, and a truncated conical part 3d is interposed between the curved surface and the rod-shaped shaft part 3a.

Figure 5:
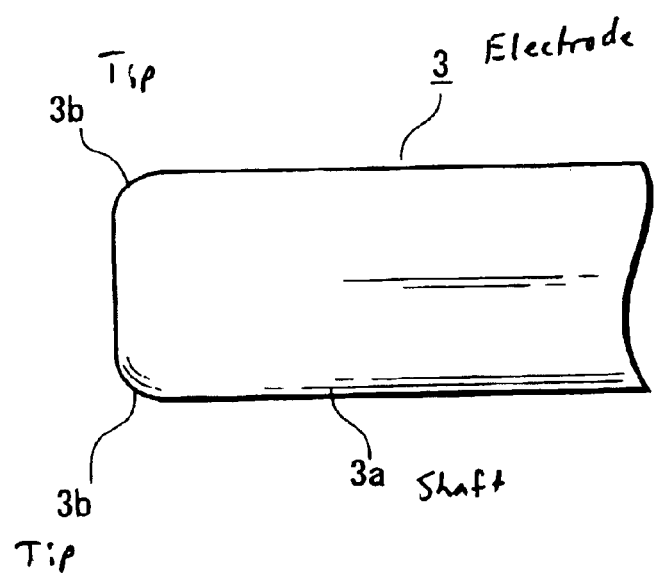
FIG. 5 is an enlarged front view of an electrode of a metal halide lamp according to a fourth embodiment of the invention.

FIG. 5 is an enlarged front view of an electrode of a metal halide lamp according to a fourth embodiment of the invention. According to this embodiment, unlike the first embodiment, the tip of the electrode 3 has a planar surface, and an annular shoulder formed between the planar surface and the shaft part 3a constitutes the region 3b having the part formed therein which originates an arc. In addition, the radius of the curved surface of the region 3b having the part formed therein which originates an arc is 40% of the diameter of the shaft part 3a.

Table 1 shows results of measurement of degrees of occurrence of luminance flicker of the metal halide lamps according to the first and third embodiments of the invention together with that of a Comparative Example. Here, the metal halide lamp of the first embodiment was constructed according to the specifications of Example. The metal halide lamp of the third embodiment was constructed according to the specifications of Example except for the structure of the electrode. The metal halide lamp of the Comparative Example was constructed according to the specifications of Example, except that the tip of the electrode had a planar surface and the region having the part formed therein which originates an arc formed between the planar surface and the shaft part was a right-angled corner. Measurement was performed as follows: the lamp power of the metal halide lamp of the Comparative Example was reduced from a state where the lamp was stably lit with a rated lamp power; a lamp power at which a luminance flicker occurred was determined as a level of 100%; the lamp power of the metal halide lamp of each of the embodiments was reduced similarly; and lamp powers for the embodiments at which a luminance flicker occurred were represented by a percentage to that of the Comparative Example.

TABLE 1

| No. | Specimen name | Luminance flicker (%) |
|---|---|---|
| 1 | Comparative Example | 100 |
| 2 | First embodiment | 65 |
| 2 | Third embodiment | 70 |

Figure 6:
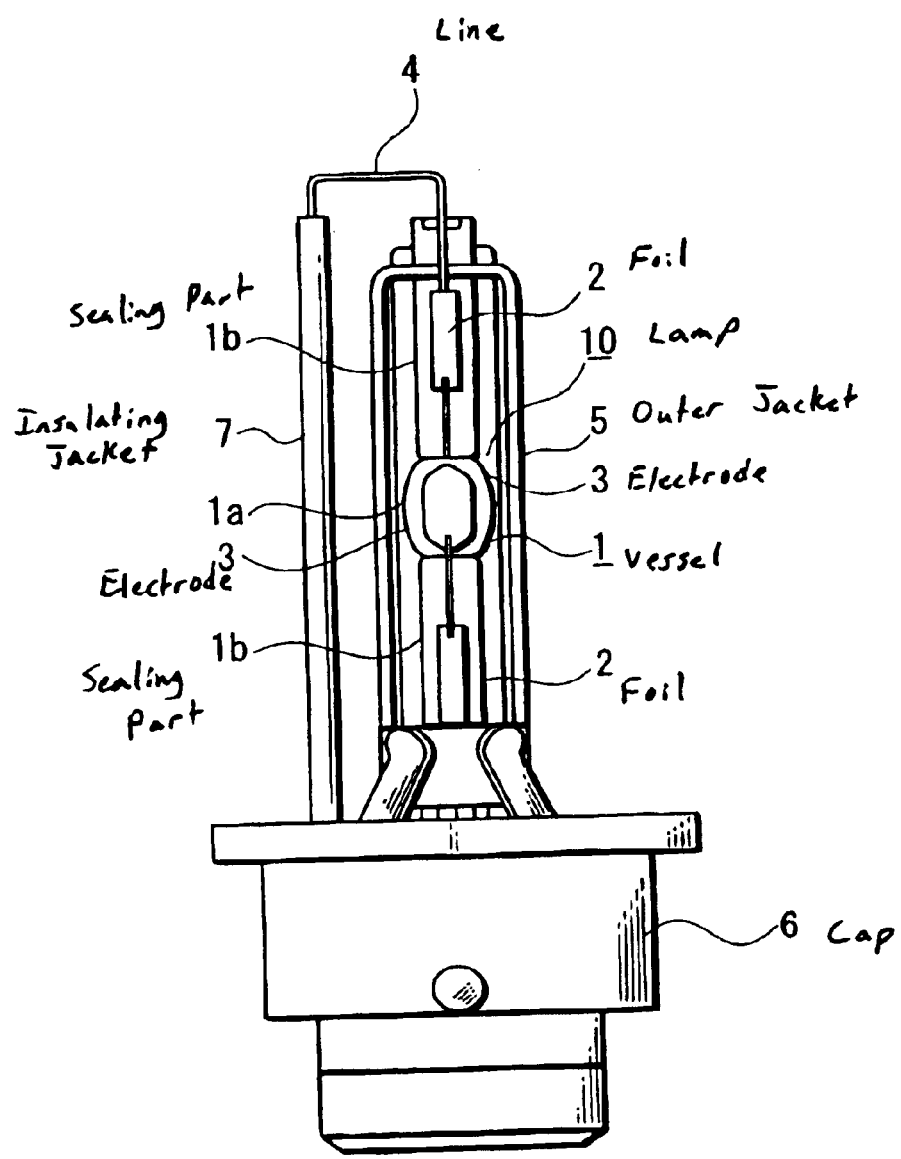
FIG. 6 is a front view of a metal halide lamp according to a fifth embodiment of the invention.

FIG. 6 is a front view of a metal halide lamp according to a fifth embodiment of the invention. According to this embodiment, the metal halide lamp similar to that shown in FIG. 1 is configured to be mounted in an automotive headlamp apparatus. In this drawing, reference numeral 5 denotes an outer jacket, reference numeral 6 denotes a cap and reference numeral 7 denotes an insulating jacket.

The outer jacket 5 has a capability of blocking ultraviolet rays. It houses a metal halide lamp 10 constructed substantially the same as that shown in FIG. 1 and has both ends fixed to the sealing parts 1b. However, it is not hermetically sealed and is communicated with the outside air. One sealing part 1b is planted in the cap 6. The externally introduced line 4 led to the outside from the other end of the outer jacket 5 extends parallel to the outer jacket 5 and is introduced into the cap 6 and connected to a terminal (not shown).

The insulating jacket 7 covers the external lead 4.

Figure 7:
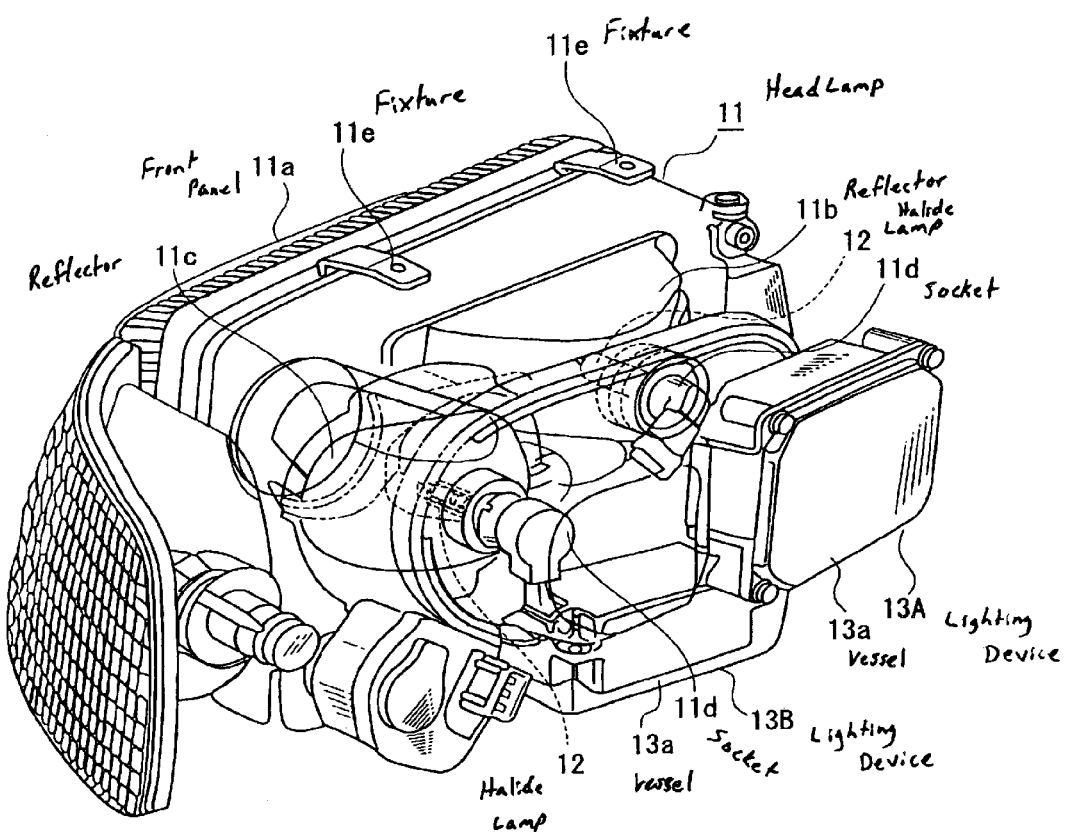
FIG. 7 is a perspective view of an automotive headlamp apparatus according to an embodiment of the invention, viewed from the rear side thereof.
Figure 8:
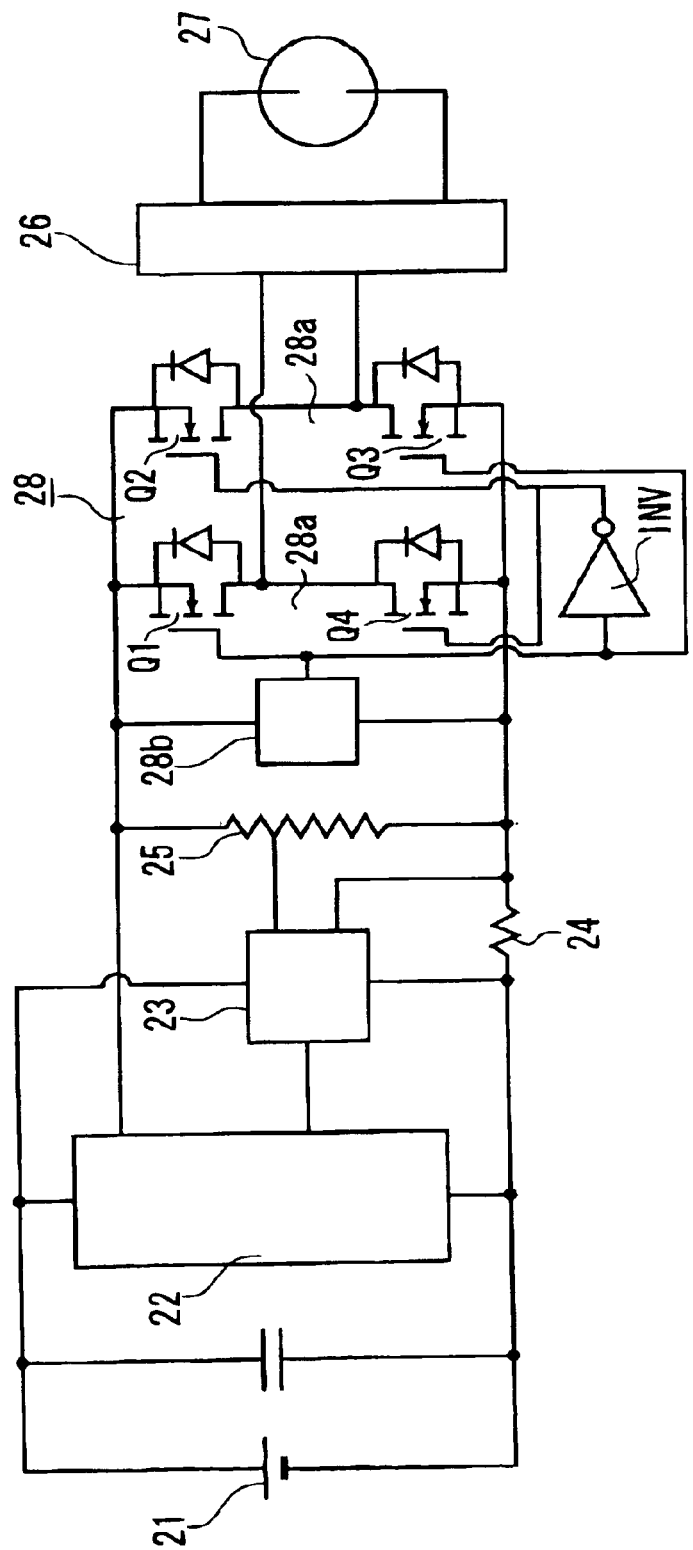
FIG. 8 is a circuit diagram of a lighting device.

FIGS. 7 and 8 shows an embodiment of the automotive headlamp apparatus according to the invention. FIG. 7 is a perspective view thereof viewed from the rear side thereof, and FIG. 8 is a circuit diagram showing a lighting device. In the drawings, reference numeral 11 denotes an automotive headlamp apparatus main unit, reference numeral 12 denotes a metal halide lamp, and reference numeral 13 denotes a lighting device.

The automotive headlamp apparatus main unit 11 comprises a front transparent panel 11a, reflectors 11b, 11c, a lamp socket 11d and a fixture 11e. The front transparent panel 11a is contoured to the shape of the surface of the automobile and has desired optical means, for example, a prism. Each of the reflectors 11b, 11c is provided for each metal halide lamp 12 and configured to provide required light distribution characteristics. The lamp socket 11d is connected to an output terminal of the lighting device 13 and is mounted in a cap 12d of the metal halide lamp 12. The fixture 11e is means for fixing the automotive headlamp apparatus main body 11 to the automobile at a predetermined position.

The metal halide lamp 12 has the construction shown in FIGS. 1 and 6. The lamp socket 11d is mounted in the cap and connected thereto. In this way, the two-bulb metal halide lamp 12 is mounted in the automotive headlamp apparatus main unit 11, and the four-bulb automotive headlamp apparatus is constructed. The light emitting parts of each metal halide lamp 12 are located generally at focal points of the reflectors 11b, 11c of the automotive headlamp apparatus main unit 11.

Lighting devices 13A, 13B each have a circuit arrangement shown in FIG. 8. It is housed in a metallic vessel 13a and energizes the metal halide lamp 12 to turn on it.

Now, the circuit arrangement of the lighting device will be described. The lighting device is arranged to turn on the metal halide lamp with an alternating current. In FIG. 8, reference numeral 21 denotes a direct current power supply, reference numeral 22 denotes a chopper, reference numeral 23 denotes control means, reference numeral 24 denotes a lamp current detecting means, reference numeral 25 denotes lamp voltage detecting means, reference numeral 26 denotes an igniter, reference numeral 27 denotes a metal halide lamp, and reference numeral 28 denotes a full-bridge inverter.

The direct current power supply 21 is means for supplying a direct current power to the chopper 22 described later, and is a battery or a rectifier direct current power supply. In general, the battery is used in the case of automobiles. However, the rectifier direct current power supply, which rectifies an alternating current, may be used. As required, an electrolytic capacitor 21a is connected in parallel with the direct current source 21 for smoothing.

The chopper 22 is a DC/DC converter circuit that converts a direct current voltage into a direct current voltage of a desired value. It controls, as desired, the metal halide lamp 27 via the full-bridge inverter 28 described later. In the case where the voltage of the direct current power supply is low, a booster chopper is used. On the other hand, in the case where the voltage of the direct current power supply is high, a step-down chopper is used.

The control means 23 controls the chopper 22. For example, the control means 23 controls the chopper 22 in such a manner that, immediately after the metal halide lamp is turned on, a lamp current three or more times higher than a rated lamp current is flowed through the metal halide lamp 27 from the chopper 22 via the full-bridge inverter 28, and then with the lapse of time, the lamp current is reduced to the rated lamp current. Furthermore, the control means 23 receives feedback of detection signals associated with the lamp current and lamp voltage, as described later, and thus, generates a constant power control signal to perform constant power control on the chopper 22. Furthermore, the control means 23 has a microcomputer incorporating a temporal control pattern and thus, is adapted to control the chopper 22 to pass a lamp current three or more times higher than a rated lamp current through the metal halide lamp 27 immediately after the metal halide lamp is turned on and reduces the lamp current with the lapse of time.

The lamp current detecting means 24 is inserted in series with the lamp via the full-bridge inverter 28 and detects a current equivalent to the lamp current to provide a control input to the control means 23.

Similarly, the lamp voltage detecting means 25 is connected parallel to the lamp via the full-bridge inverter 28 and detects a voltage equivalent to the lamp voltage to provide a control input to the control means 23.

The igniter 26 is interposed between the full-bridge inverter 28 and the metal halide lamp 27 and adapted to supply a starting pulse voltage on the order of 20 kV to the metal halide lamp 27 when turning on the lamp.

The full-bridge inverter 28 comprises a bridge circuit 28a consisting of four MOSFETs Q1, Q2, Q3 and Q4, a gate drive circuit 28b that alternately switches between the MOSFETs Q1 and Q3 and the MOSFETs Q2 and Q4 in the bridge circuit 28a, and a polarity inverting circuit INV. The full-bridge inverter 28 converts the direct current voltage from the chopper 22 into a rectangular low-frequency alternating current voltage by the switching and applies the resulting voltage to the metal halide lamp 27 to turn on the lamp with the low-frequency alternating current.

If the metal halide lamp is turned on with the rectangular low-frequency alternating current by the metal halide lamp lighting device in this way, the metal halide lamp produces a desired luminous flux immediately after it is turned on. Accordingly, 25% of the rated luminous flux can be attained 1 second after the power-on and 80% of the rated luminous flux can be attained 4 seconds after the power-on, which are requirements of the automotive headlamp.

According to the invention described in claim 1, there is provided a metal halide lamp comprising: a hermetic vessel; a pair of electrodes sealed in the hermetic vessel with facing each other at a distant of 5 mm or less, the electrodes each having a shaft part having a diameter of 0.25 mm or more and a part, which originates an arc, having a curved surface having a radius of one-half or less of the diameter of the shaft part; and a discharge medium substantially containing no mercury, sealed in the hermetic vessel, and containing halides of metals including a light-emitting metal in an amount of 0.005 mg/mm$^3$ of an inner volume of the hermetic vessel or more and a xenon gas at 5 atmospheres or higher at a temperature of 25° C., wherein the metal halide lamp is turned on with a lamp power of 60 W or lower in a stable state, the metal halide lamp is environmentally friendly because it substantially contains no mercury, and a luminance flicker is unlikely to occur.

According to claim 2, since the diameter of the shaft part of each of the pair of electrodes is 0.25 to 0.4 mm, there is provided a metal halide lamp having a long electrode life time and a high light emission efficiency can be provided.

According to claim 3, since the part of each of the pair of electrodes, which originates an arc, has a curved surface having a radius which is 0.2 to 0.5 times the diameter of the shaft part, there is provided a metal halide lamp whose electrodes are unlikely to be exhausted and which provides a reduced luminance flicker.

According to claim 4, since the xenon gas in the discharge medium is at a pressure of 5 to 20 atmospheres, there is provided a metal halide lamp which is easy to manufacture and whose inner pressure is not excessively increased during the lighting-on time thereof.

According to claim 5, there is provided a metal halide lamp comprising: a hermetic vessel which is fire resistant and translucent; a pair of electrodes sealed in the hermetic vessel with facing each other at a distant of 5 mm or less, the electrodes each having a shaft part having a diameter of 0.25 to 0.4 mm and a part which originates an arc having a curved surface having a radius which is 0.2 to 0.5 times the diameter of the shaft part; and a discharge medium substantially containing no mercury, sealed in the hermetic vessel, and containing halides of metals including a light-emitting metal in an amount of 0.005 mg/mm$^3$ of an inner volume of the hermetic vessel or more and a xenon gas at 5 to 20 atmospheres at a temperature of 25° C., in which, in a stable state, the metal halide lamp is turned on with a lamp power of 60 W or lower, the metal halide lamp being capable of meeting the conditions of the preferred numerical ranges prescribed for the metal halide lamp described in claim 1.

According to claim 6, since the inner volume of the hermetic vessel is 0.01 cc or less, there is provided a small metal halide lamp suitable for an automotive headlamp, for example.

According to claim 7, since the paired electrodes are at a distance of 3.5 to 5 mm from each other, there is provided a small metal halide lamp suitable for an automotive headlamp, for example.

According to claim 8, since the diameter of the shaft part of each of the pair of electrodes is 0.3 to 0.4 mm, there is provided a small metal halide lamp that has a long electrode life time and is suitable for an automotive headlamp, for example.

According to claim 9, since the halides of metals include at least one of halides of Sc, Na and rare earth metals, there is provided a metal halide lamp that can effectively emit white light, which is specified for the metal halide lamp for an automotive headlamp, with high efficiency.

According to claim 10, since the xenon gas is at a pressure of 8 to 16 atmospheres, there is provided a metal halide lamp suitable for an automotive headlamp whose lamp voltage is increased to a preferred value, which has good rising characteristics of the luminous flux and is easy to manufacture and whose pressure during the lighting-on time thereof is not excessively increased.

According to claim 11, since the lamp power is 35 W±3 W, there is provided a metal halide lamp whose lamp power falls within a range suitable for an automotive headlamp.

According to claim 12, there is provided a metal halide lamp suitable for an automotive headlamp, comprising: a hermetic vessel which is fire resistant and translucent and has an inner volume of 0.01 cc or less; a pair of electrodes sealed in the hermetic vessel with facing each other at a distant of 3.5 to 5 mm, the electrodes each having a shaft part having a diameter of 0.3 to 0.4 mm and a part which originates an arc having a curved surface having a radius which is 0.2 to 0.5 times the diameter of the shaft part; and a discharge medium substantially containing no mercury, sealed in the hermetic vessel, and containing halides of metals including a light-emitting metal, which is at least one of Sc, Na and rare earth metals, in an amount of 0.005 mg/mm$^3$ of an inner volume of the hermetic vessel or more and a xenon gas at 8 to 16 atmospheres at a temperature of 25° C., in which, in a stable state, the metal halide lamp is turned on with a lamp power of 60 W or lower.

According to claim 13, since the paired electrodes are at a distance of 4.2±0.6 mm from each other, there is provided a metal halide lamp with a distance between the electrodes being more suitable for an automotive headlamp.

According to claim 14, since the halides of metals in the discharge medium include at least ScI$_3$ and NaI, there is provided a metal halide lamp which can emit, with high efficiency, white light whose chromaticity is likely to fall within a range of a specified value.

According to claim 15, since the halides of metals in the discharge medium include at least ScI$_3$, NaI, and InBr and/or InI, there is provided a metal halide lamp that emits light whose chromaticity is more likely to fall within the range of the specified value.

According to the invention described in claim 16, there is provided an automotive headlamp apparatus that comprises:

an automotive headlamp apparatus main unit; a metal halide lamp described in claim 1 installed in the main unit of the automotive headlamp apparatus; and a lighting device for turning on the metal halide lamp and therefore, can provide the advantages described in any one of claims 1 to 15.

What is claimed is:

1. A metal halide lamp, comprising:

a hermetic vessel which is fire resistant and translucent;

a pair of electrodes sealed in the hermetic vessel facing each other at a distance of 5 mm or less, the electrodes each having a shaft part having a diameter of 0.25 mm or more and a tip part having a diameter of the same or less than the diameter of the shaft part, and a place for an arc to originate at the tip part has a curved surface with a radius of one-half or less of the diameter of the shaft part; and a discharge medium substantially containing no mercury, sealed in the hermetic vessel, and containing halides of metals including a light-emitting metal in an amount o 0.005 mg/mm$^3$ of an inner volume of the hermetic vessel or more and a xenon gas at 5 atmospheres or higher at a temperature of 25° C., wherein, in a stable state, the metal halide lamp is turned on with a lamp power of 60 W or lower.

2. The metal halide lamp according to claim 1, wherein the diameter of the shaft part of each of the pair of electrodes is 0.25 to 0.4 mm.

3. The metal halide lamp according to claim 1, wherein the part of each of the pair of electrodes, which originates an arc, has a curved surface having a radius which is 0.2 to 0.5 times the diameter of the shaft part.

4. The metal halide lamp according to claim 1, wherein the xenon gas in the discharge medium is at a pressure of 5 to 20 atmospheres.

5. A metal halide lamp, comprising:

a hermetic vessel which is fire resistant and translucent;

a pair of electrodes sealed in the hermetic vessel facing each other at a distance of 5 mm or less, the electrodes each having a shaft part having a diameter of 0.25 to 0.4 mm that does not increase towards a tip part of the shaft and a place for an arc to originate at the tip part has a curved surface with a radius which is 0.2 to 0.5 times the diameter of the shaft part; and a discharge medium substantially containing no mercury, sealed in the hermetic vessel, and containing halides of metals including a light-emitting metal in an amount of 0.005 mg/mm$^3$ of an inner volume of the hermetic vessel or more and a xenon gas at 5 to 20 atmospheres at a temperature of 25° C., wherein, in a stable state, the metal halide lamp is turned on with a lamp power of 60 W or lower.

6. The metal halide lamp according to claim 5, wherein the inner volume of the hermetic vessel is 0.01 cc or less.

7. The metal halide lamp according to claim 5, wherein the paired electrodes are at a distance of 3.5 to 5 mm from each other.

8. The metal halide lamp according to claim 5, wherein the diameter of the shaft part of each of the pair of electrodes is 0.3 to 0.4 mm.

9. The metal halide lamp according to claim 5, wherein the halides of metals in the discharge medium include at least one of halides of Sc, Na, and rare earth metals.

10. The metal halide lamp according to claim 5, wherein the xenon gas in the discharge medium is at a pressure of 8 to 16 atmospheres.

11. The metal halide lamp according to claim 5, wherein the lamp power is 35 W ±3 W.

12. An automotive headlamp apparatus, comprising:

an automotive headlamp apparatus main unit;

a metal halide lamp according to claim 5 installed in the main unit of the automotive headlamp apparatus; and a lighting device for turning on the metal halide lamp.

13. A metal halide lamp, comprising:

a hermetic vessel which is fire resistant and translucent and has an inner volume of 0.01 cc or less;

a pair of electrodes sealed in the hermetic vessel facing each other at a distance of 3.5 to 5 mm, the electrodes each having a shaft part having a diameter of 0.3 to 0.4 mm that does not increase towards a tip of the shaft and a place for an arc to originate at the tip part has a curved surface with a radius which is 0.2 to 0.5 times the diameter of the shaft part; and a discharge medium substantially containing no mercury, sealed in the hermetic vessel, and containing halides of metals including a light-emitting metal, which is at least one of Sc, Na, and rare earth metals, in an amount of 0.005 mg/mm$^3$ of an inner volume of the hermetic vessel or more and a xenon gas at 8 to 16 atmospheres at a temperature of 25° C., wherein, in a stable state, the metal halide lamp is turned on with a lamp power of 60 W or lower.

14. The metal halide lamp according to claim 13, wherein the paired electrodes are at a distance of 4.2 ±0.6 mm from each other.

15. The metal halide lamp according to claim 13, wherein the halides of metals in the discharge medium include at least $ScI_3$ and NaI.

16. The metal halide lamp according to claim 13, wherein the halides of metals in the discharge medium include at least $ScI_3$, NaI, and InBr and/or InI.

* * * * *